A. W. DELANE.
RESILIENT WHEEL.
APPLICATION FILED OCT. 26, 1915.
1,225,225.
Patented May 8, 1917.
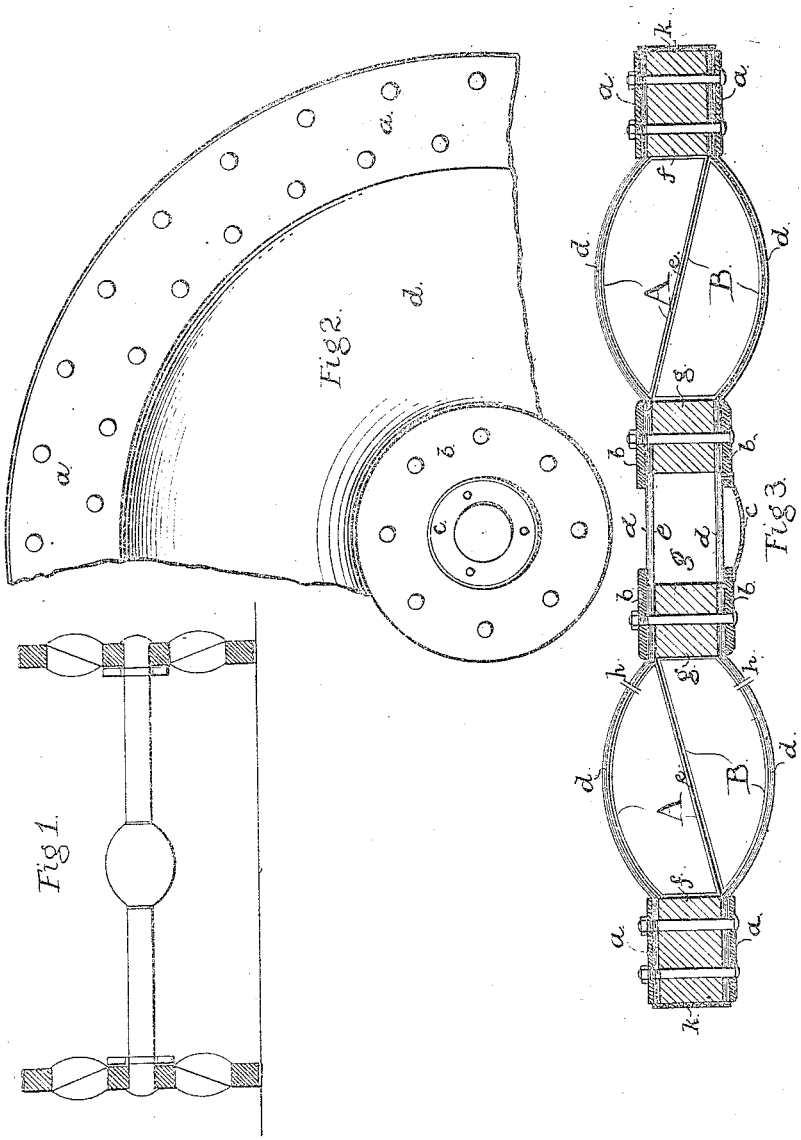

UNITED STATES PATENT OFFICE.

ANSON W. DELANE, OF NEW YORK, N. Y.

RESILIENT WHEEL.

1,225,225.  Specification of Letters Patent.  Patented May 8, 1917.

Application filed October 26, 1915. Serial No. 58,041.

*To all whom it may concern:*

Be it known that I, ANSON W. DELANE, a citizen of the United States, residing at 29 West Sixtieth street, New York city, in the county and State of New York, have invented a new and useful Improvement in Resilient Wheels, of which the following is a specification.

The object of my invention is to provide a cheap and durable pneumatic wheel for vehicles; and also to eliminate the encircling pneumatic tires, and the springs, which are a frequent source of discomfort and danger, and also add materially to the cost of said vehicles.

The annexed description, together with the accompanying drawings, with the letters and figures thereon are sufficient to enable persons skilled in the mechanical arts to make and use the same.

Figure 1, is a general view of my invention as applied to automobiles, and the device may be as well applied to vehicles of all kinds.

Fig. 2, is a side elevation of the hub with a quadrant of the "side members", rim and tire.

Fig. 3, is a full cross-section of the wheel.

In Figs. 2 and 3, "a—a" represents circular parallel steel plates inclosing a felly "f", and encircling the "side members", "d—d", and the hub-plates "b—b"; "d—d" are circular layers of resilient material, preferably multiple sheets, spun of steel, which form the body of the wheel and are secured within the rims "a—a" and the felly "f" near the periphery by suitable bolts, and are also bolted to the plates "b—b", inclosing the core of the hub "g", near the center of the wheel; "e" is a circular tie of resilient material, preferably multiple sheets, spun of steel, extending across the entire wheel-body diagonally, from one side of the hub to the opposite side of the felly; thus forming alternately during the revolution of the wheel a brace on one side and a tie on the other, and dividing the wheel into two unequal, opposed, annular, pneumatic sections, "A—A" and "B—B", which are filled through the air valves "h". A wheel may be made of any required strength by increasing the number of sheets in each division of the wheel-body, or by using heavier gages of material; and the efficiency of the tie or brace may be increased by making the felly and tread wider, and the tractive effect will also be greater.

I do not limit myself to the use of rubber to form the pneumatic chambers.

Nor do I limit myself to the use of any tire or tread.

Having thus described my invention, what I claim as new and desire to secure by Letters Patent is:

1. A resilient wheel having a double-convex wheel-body of resilient material secured between parallel plates separated by a felly, and encircled plates, separated by a hub.

2. A wheel of resilient material having an interior air-retaining, annular tie or brace diagonally secured across a double convex wheel-body, said brace or tie separating the wheel-body into two separate compartments.

3. A wheel of resilient material having an annular tie of resilient material, diagonally secured across the wheel-body between the felly plates and the opposite side of the hub plates.

4. A resilient wheel having within a double-convex, flexible wheel-body, an annular, diagonally disposed, flexible tie and two unequal, opposed, annular, pneumatic chambers.

5. A wheel of resilient material having within a double-convex wheel-body, an annular, diagonally disposed tie, spun of steel sheets, secured across the wheel-body forming two unequal, opposed, annular pneumatic chambers, the diagonal wall of one of said chambers lying in close contact with that of the other.

6. A resilient wheel having a double-convex wheel-body, composed of multiple flexible sheets in each division, a flexible tie, also of multiple sheets, secured within and extending diagonally across, forming continually at opposite sides of the wheel, during revolution alternately a brace and a tie, and also forming two unequal, opposed, annular, pneumatic chambers, the positions of the same being alternately superposed, in revolution.

ANSON W. DELANE.